Dec. 13, 1966    J. J. ROSENBLATT    3,291,976
ILLUMINATION SYSTEM

Filed May 19, 1964    3 Sheets-Sheet 1

INVENTOR.
JEROME J. ROSENBLATT,
BY Walter R. Thiel
ATTORNEY.

INVENTOR.
JEROME J. ROSENBLATT,
BY Walter R. Thiel
ATTORNEY.

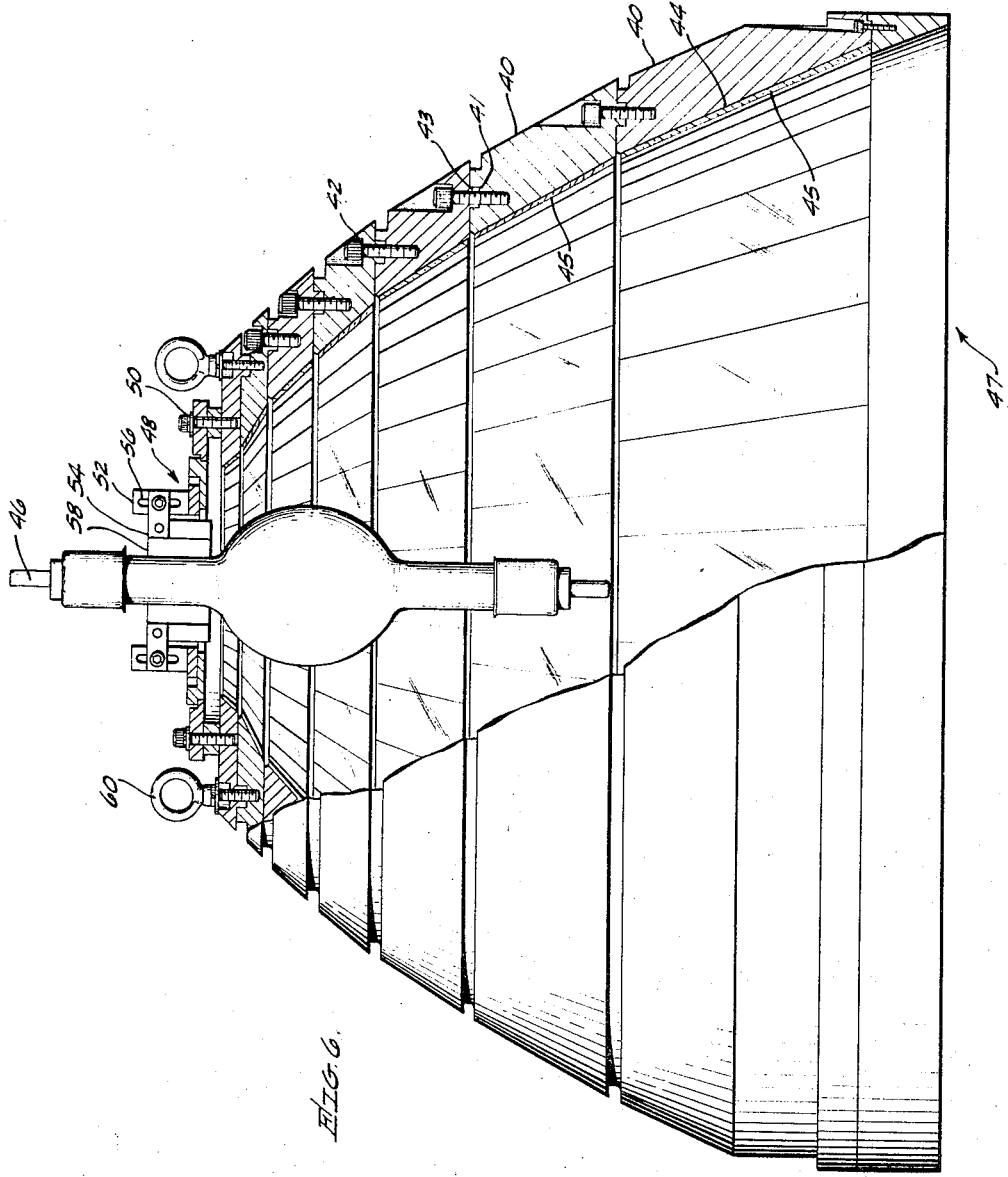

3,291,976
ILLUMINATION SYSTEM
Jerome J. Rosenblatt, Los Angeles, Calif., assignor to Hughes Aircraft Company, Culver City, Calif., a corporation of Delaware
Filed May 19, 1964, Ser. No. 368,637
4 Claims. (Cl. 240—41.35)

This invention relates to an illumination system and more particularly to a system to collect the radiant energy from a light source and project this energy to a plane with a uniform distribution of light energy or illumination throughout a predetermined area of the plane.

At the present time, the best known method to collect and project energy from a source to a plane is either by a refractive lens system or a spherical, parabolic, elliptical or any other aspherical shaped reflective collector. While each of these systems has proven satisfactory in certain applications such as light projection systems for photographic slides or subject illumination, such as lighthouse beams or search light, they have proven inefficient for uses demanding near perfect collection of light energy and the projection of such energy to a plane to produce uniform illumination throughout a predetermined area of the plane.

Therefore, an object of the present invention is to provide an improved illumination system which projects light energy onto a plane so that a predetermined area of the plane is uniformly illuminated.

A further object of the present invention is to provide an improved illumination system which is more efficient in both light collection and projection than existing refractive lens and reflective collector systems.

A still further object of the present invention is to provide an improved illumination system which utilizes reflective surfaces to produce a more efficient, less expensive system.

Briefly, the present invention is basically a reflective light device comprising several annular rings of various diameters and thicknesses each of which includes a plurality of specifically shaped and located flat mirrors that when assembled into one unit form a generally elliptical configuration. The flat mirrors in each ring subtend an equivalent solid angle to all others in the ring as well as to the mirrors in the other rings. The mirrors are bonded to the annular rings and are automatically aligned by having their longitudinal edges touching the surface of the ring and are located vertically by contact with one of the flat end surfaces of the ring. The rings are assembled into a single unit and a high radiant energy lamp is mounted to the unit in juxtaposition to the mirrors so that the point of concentrated radiant energy of the lamp is located at a precisely predetermined position.

Other advantages of the invention will hereinafter become more fully apparent from the following description of the drawings which illustrates a preferred embodiment thereof, and in which:

FIG. 6 is an enlarged view of the improved illumination system of the present invention having a portion cut away to show the relative location of the various elements of the system.

Figure 1:
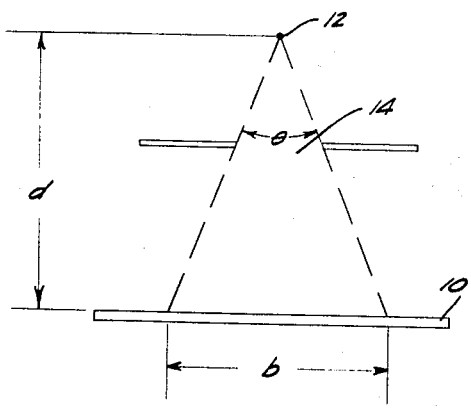
FIGURE 1 is a diagrammatical sketch of an illumination system illustrating the illumination of a target surface by a theoretical point source of light energy.
Figure 2:
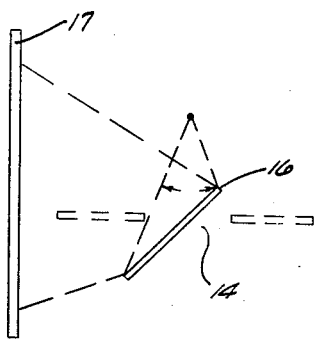
FIG. 2 is a diagrammatical sketch of an illumination system similar to FIG. 1 showing the substitution of a reflective surface for the aperture shown in FIG. 1.

Referring now to FIGS. 1 and 2, the optimum method to project radiation from a light source onto a plane or target surface 10 located at a distance $d$ from the source to produce uniform illumination of a predetermined area of the plane having a dimension $b$, is to use a theoretical point source 12 such that the segment or cone of light $\theta$ passed by an aperture 14 projects the required area on the plane 10. Thus the plane can be moved relative to the point source and the size of the area $b$ of uniform illumination on the plane will vary. However, the larger the distance $d$ the less the light energy illuminated area $b$, since the light received by the plane is inversely proportional to the square of the distance $d$. This assumes that the point source is located normal to the plane and is a uniform source. The use of a nonuniform source is discussed later.

As shown in FIG. 2 if a reflective surface 16 such as a mirror is substituted into the system of FIG. 1 and positioned at the center of the aperture 14, it can be rotated to a position that will reflect onto a target plane 17 light energy of the same uniformity as that passed by the aperture 14. By this principle a source of light energy that projects in one direction such or through the aperture 14 can be reflected so that it will illuminate a plane located in almost any direction from the source. It is on the basis of this principle that the improved illumination system of the present invention was developed. The present invention captures substantially all the radiation from a light source and projects it to a target plane as if the energy were coming from a number of sources rather than from a single source. To do this the system makes many images of the source and projects each of these to the target plane.

Figure 3:
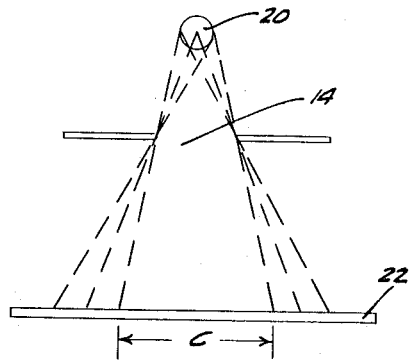
FIG. 3 is a diagrammatical sketch of an illumination system similar to FIG. 1; illustrating the substitution of a light source of finite dimension for the point source of FIG. 1.

In addition to FIG. 1, referring now to FIG. 3, a point source is theoretical since all light sources have some finite dimension; therefore, this figure illustrates the substitution of a spherical source of light energy 20 having a finite diameter for the point source 12 of FIG. 1 and the resulting segments or cones of light energy radiated from the center and the ends of one diameter of the spherical source 20. Since in effect there are an indefinite number of point sources in a finite source, shown here for clarity as three, the area of illumination of a target plane 22 by each point source will not coincide; however, by changing the size of the aperture 14 a size will be found where the illumination of a predetermined area $c$ on the target plane 22 will be constant. If the aperture 14 were made larger the area $c$ on the target plane 22 would become larger, if the aperture 14 were made smaller the area $c$ on the target plane 22 would become smaller. For best efficiency the size of the aperture should be just great enough to produce the target area desired without a significant amount of excess area illuminated.

Figure 5:
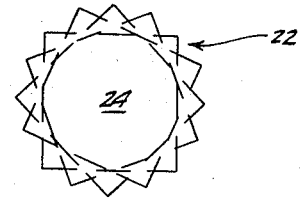
FIG. 5 is a diagrammatical sketch of the overlapping of the light energy reflected by a number of mirrors located, sized, and positioned by the teaching of the present invention to produce on a plane a predetermined area of uniform intensity.

It is on the principle of the point source analogy of a finite source that the present invention utilizes a plurality of mirrors each projecting the equivalent of a source. Therefore, if a mirror is precisely positioned to reflect each of the sources of a finite source and these mirrors are mounted to annular support rings circumscribing the source and are of sufficient number to collect substantially all of the light energy radiated from the source, the projection of the solid angle of light received by each mirror, if the mirrors are trapezoidal in shape, will be a pattern 22 as shown in FIG. 5 having a central substantially circular portion 24 of uniform intensity. If that portion of the light source the aperture intercepts is not quite uniform, as is the case with most conventional light sources, it is compensated for by the mirror on the same ring but diametrically opposing it.

Figure 4:
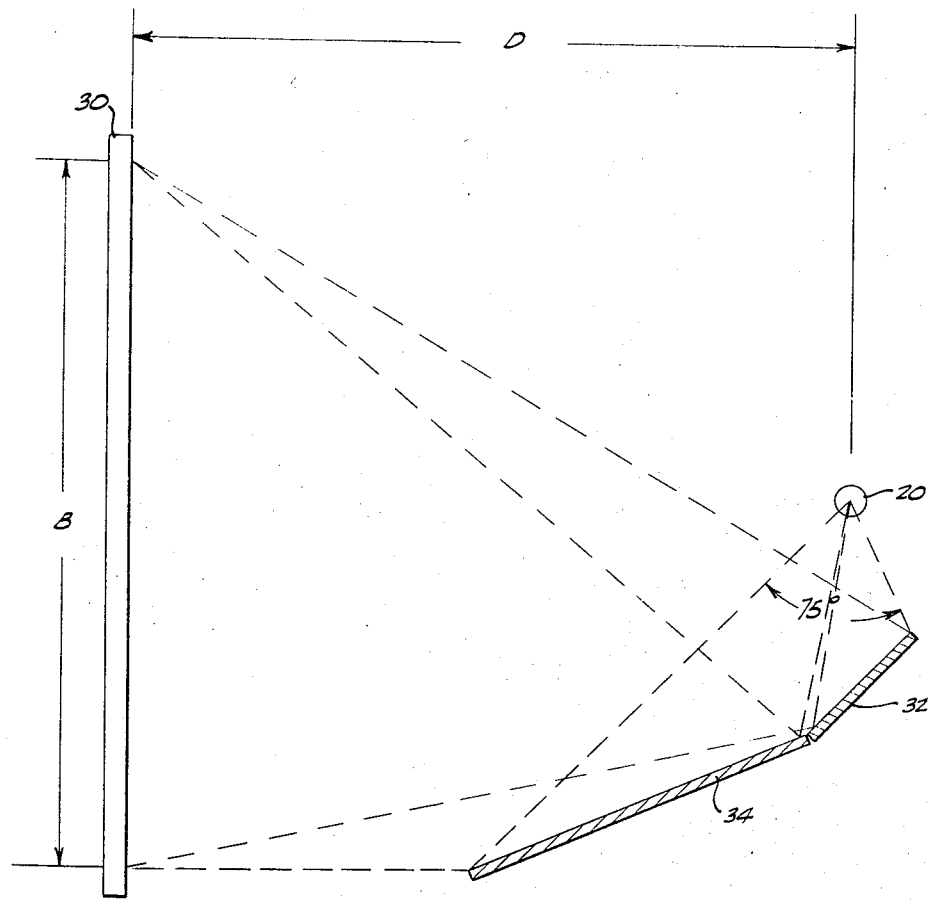
FIG. 4 is a diagrammatical sketch of the light source and reflective mirrors of the present invention illustrating their size and location as determined by the principle of the present invention.

Referring to FIG. 4 specifically, for the sake of this discussion, if the finite source 20 is assumed to have an angle of radiation of light energy of 75° through 360° of revolution and a pair of rings of mirrors 32, 34 are provided to reflect substantially all of this energy, then each mirror in each ring receives a solid angle of radiation of 37.5° as measured at the apex of the cone of the solid angle. Having selected these parameters and knowing that the finite source 20 must be located at a known distance such as D from a target plane 30 and that the constant intensity or uniform illumination area of the target plane 30 must have a dimension B, each of the mirrors 32, 34 must be positioned at an angle sufficient to reflect the solid angle of light received thereby. Thus, by positioning these mirrors to accomplish this objective, their length and width is determined as typically illustrated in FIG. 4 and will not be the same but will increase the further the distance of the mirror from the finite source 20. Having determined the position and length of the mirrors in the two rings their shape is determined by the distance of both the top and bottom of the ring from the source. Thus, since the rings are a section of a cone, this defines a trapezoidal shape.

Maximum efficiency results when the mirrors which are trapezoidal in shape are of the minimum size for the predetermined target area.

Figure 7:
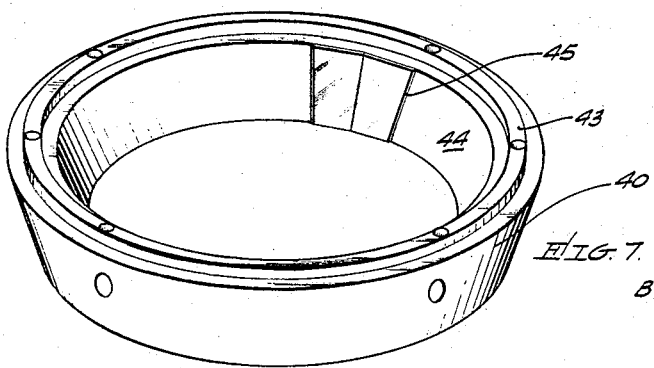
FIG. 7 is a reduced perspective view of one of the ring supporting structures of the present invention and including two mirrors attached thereto illustrating the positioning of the mirrors.

In FIGS. 6 and 7 is shown one embodiment of the configuration of mirrors as discussed above to provide this novel illuminating system and include a plurality of annular mirror supporting rings 40 each including an annular notch 41 on one surface thereof and an annular tab 43 or extension on the other surface adapted to mate with one of the annular notches to assemble by a plurality of bolts 42 the rings into a cup-like structure or assembly 47 having a circular opening at both ends. The circular openings at one end being substantially larger than the circular opening at the other end. Each of the annular supporting rings has an inner surface 44 which is precisely shaped and inclined at a predetermined angle relative to a source of light energy 46 so that when a plurality of flat mirrors 45 are attached thereto and the rings are assembled and secured each mirror will be at the predetermined angle for that mirror to reflect the solid angle of light from the source 46 falling thereon to illuminate a target plane of a determined size and at a predetermined distance from the source 46. Typically the light source may be one of many commercially available high intensity light sources such as for example a D.C. Xenon mercury compact arc lamp.

Attached to the top or uppermost ring by conventional means such as set screws is a light source mounting bracket 48. This bracket includes a plurality of attachment screws 50 and a lamp supporting fixture 52 which comprises a pair of supporting arms movably secured by a set screw to a notch 56 in the fixture so that they can be moved for supporting light sources of different dimension and to precisely position the source. Since the light source is enclosed within a glass envelope the attachment fixture also includes a plurality of gripping or cushioning pads 58 of a soft, resilient material to provide a cushioning when the light source is secured within the supporting arms 54. Also secured to the uppermost ring are a plurality of structural lifting rings 60 each positioned at quarter points around the top so that if desired the system may be moved by attaching suitable means to the rings 60.

As best shown in FIG. 7 the mirrors 45 are attached to the precisely formed inner surface 44 with the longitudinal edges in direct contact with the surface 44. This is accomplished by making the mirrors flat and applying a bonding agent such as epoxy to the center of each mirror and pressing it against the surface until the epoxy spreads out to hold the longitudinal edges in substantial engagement with the surface 44. Thus by maintaining extremely close tolerances on the surfaces 44, the mirrors 45 for each ring can be precisely positioned by bonding them with their longitudinal edges engaging the surface and one transverse edge substantially flush with one annular edge of the surface. After the first mirror has been secured to a particular ring the next mirror is secured adjacent thereto with as little spacing as possible between; thus minimizing the nonreflecting area.

While primarily one embodiment of this invention has been described and has been shown to include seven annular rings each including trapezoidally shaped mirrors located at precisely determined angles from a specific light source, it should be appreciated by those skilled in the art that variations of this disclosed arrangement both as to its details and as to the organization of such details such as the number of rings, shape of mirrors, or orientation of mirrors may be made without departing from the spirit and principle of the invention as described. Accordingly, it is intended that the foregoing disclosure and showings made in the drawings may be considered as illustrative of the principles of this invention and not construed in a limiting sense.

What is claimed is:

1. An illumination system comprising:
  a mirror support assembly including a plurality of juxtaposed concentric rings each having an inside diameter different than that of the other rings and a flat inner surface inclined at a predetermined angle relative to said light source, said assembly having one end smaller than the other;
  a light source mounting bracket attached to said smaller end;
  a plurality of flat mirrors attached to the inner surface of said rings; and
  a light source attached to said mounting bracket and extending into the assembly sufficiently to enable each mirror to reflect an equal solid angle of the light energy from said source.

2. An illumination system comprising:
  a mirror support assembly including a plurality of juxtaposed concentric rings each having an inside diameter different than that of the other rings and a flat inner surface inclined at a predetermined angle relative to said light source, said assembly having one end of smaller diameter than the other;
  a plurality of flat mirrors attached to the inner surface of said rings the mirrors for each ring being of substantially the same size, while the mirrors of different rings being of different sizes; and
  a light source attached to said smaller end and extending into the assembly sufficiently to enable each mirror to reflect an equal solid angle of the light energy from said source.

3. The illumination system of claim 2 wherein each of the mirrors is of a trapezoidal shape.

4. An illumination system for providing a predetermined area of uniform illumination on a plane at a known distance from a source of light energy comprising:
  a plurality of specifically oriented flat reflective surfaces precisely positioned in a plurality of concentric rings around said source, each of said rings being attached to another ring and having a diameter different than the diameter of the other rings, said diameter being smallest nearest to said light source and increasing the further the ring from said light source; and said reflective surfaces being oriented relative to said source as a function of the distance of the source from the plane and the size of the desired area of uniform illumination on said plane.

References Cited by the Examiner

UNITED STATES PATENTS

| | | | |
|---|---|---|---|
| 1,519,448 | 12/1924 | Gamain | 240—41.36 X |
| 2,228,559 | 1/1941 | Cox | 240—41.36 X |
| 2,565,757 | 8/1951 | Coulter | 240—41.36 X |

NORTON ANSHER, *Primary Examiner.*

C. R. RHODES, *Examiner.*